(No Model.)

H. BUNKER.
ANTI-RATTLER FOR THILL COUPLINGS.

No. 497,858. Patented May 23, 1893.

Witnesses
H. G. McMillan
F. A. Woodward

Inventor
Harman Bunker
by Donald C. Ridout & Co.
Attys.

UNITED STATES PATENT OFFICE.

HARMAN BUNKER, OF BARRIE, CANADA, ASSIGNOR OF ONE-HALF TO JAMES HERBERT McKEGGIE, OF SAME PLACE.

ANTI-RATTLER FOR THILL-COUPLINGS.

SPECIFICATION forming part of Letters Patent No. 497,858, dated May 23, 1893.

Application filed May 4, 1892. Serial No. 431,791. (No model.)

*To all whom it may concern:*

Be it known that I, HARMAN BUNKER, of the town of Barrie, in the county of Simcoe, in the Province of Ontario, Canada, have invented a certain new and Improved Anti-Rattler for Thill-Couplings, of which the following is a specification.

The object of the invention is to provide a simple device which may be readily applied to a thill coupling for the purpose of preventing any rattling, and it consists, essentially, of a metal wedge arranged in connection with a strip of rubber, leather or similar material and located between the end of the thill iron and the bracket on which the thill iron is pivoted, substantially as hereinafter more particularly explained, and then definitely claimed.

Figure 1:
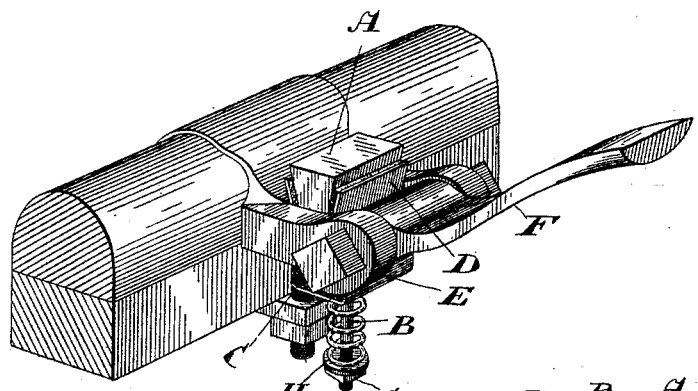
Figure 2:
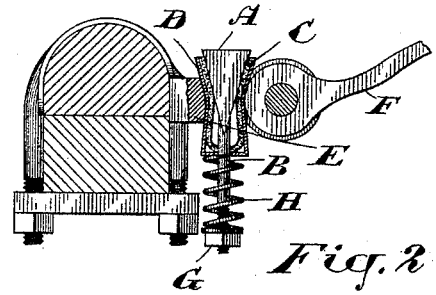
Figure 3:
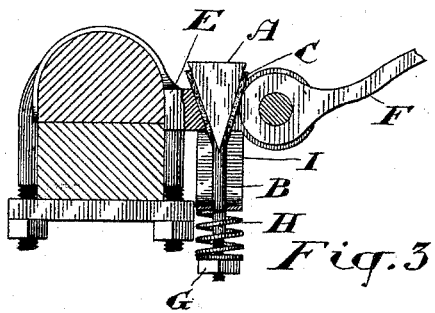
Figure 4:
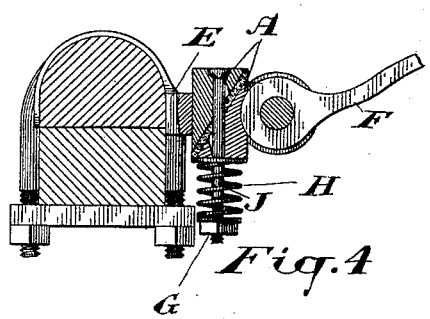

Figure 1, is a perspective view of my anti-rattler applied to an ordinary thill coupling. Fig. 2, is a cross section of Fig. 1. Figs. 3 and 4 represent alternative forms of my improved anti-rattler.

Like letters of reference indicate corresponding parts in each figure.

A, represents a wedge preferably of metal and when applied as shown in Figs. 1 and 2 or 3, the said wedge is fixed to or forms part of the shank B.

C, is a piece of leather, rubber or other similar material, which when made as shown in the first three figures of the drawings, is folded so as to lie on each side of the wedge A, and has a hole made in its center through which the shank B, passes.

D, is a strip of metal made like the strip of leather C, and forming an outer protection for the said leather, as shown in Figs. 1 and 2.

The wedge A, is placed between the jaws of the bracket E, immediately behind the end of the thill iron F, so that in the event of any wear in the joint of the thill iron, the said wear may be taken up by simply tightening the wedge. In order to tighten the wedge A, I provide the shank B, with a nut G, and in order to prevent the said wedge being held too rigidly, I place a spiral spring H, between the nut G, and the metal strip D, when the anti-rattler is arranged, as shown in Figs. 1 and 2.

In Fig. 3, I dispense with the metal strip D, and substitute a metal loop I, formed on the bracket E. In Fig. 4, I show the wedge A, divided into two parts separated by a piece of leather, rubber or similar material, the two parts being held together by a bolt J, which is a substitute for the shank B.

In order to prevent any rattling when arranged in this form, the bolt J, is tightened so as to draw upon the two parts of the wedge A, and force them to pass each other.

From this description it will be seen that a thill coupling provided with my anti-rattler may be worked with perfect freedom and yet without the slightest noise.

What I claim as my invention is—

1. The combination with a thill iron, of a wedge A, provided with a shank B or bolts J, and a leather or rubber loop C extending on each side of said wedge, substantially as and for the purpose specified.

2. A wedge A, provided with a shank B having a nut G, a rubber strip C, a metal strip D, and spring H, substantially as and for the purpose specified.

3. In a thill coupling, the combination of a wedge A provided with a shank B or bolts J and having a nut G and spring H, with a rubber or leather strip alongside said wedge, substantially as and for the purpose specified.

Barrie, April 21, 1892.

HARMAN BUNKER.

In presence of—
T. BUCROFT,
J. S. JAMIESON.